US008943126B1

(12) United States Patent
Feldman (10) Patent No.: US 8,943,126 B1
(45) Date of Patent: Jan. 27, 2015

(54) RATE LIMITER FOR PUSH NOTIFICATIONS IN A LOCATION-AWARE SERVICE

(75) Inventor: Adam Jonah Feldman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/590,848

(22) Filed: Aug. 21, 2012

(51) Int. Cl.
*G06F 15/16* (2006.01)
(52) U.S. Cl.
USPC ............................ 709/203; 709/205; 709/207
(58) Field of Classification Search
CPC .......... G06F 17/2765; G06F 17/30867; G06F 3/0481; G06F 3/0482; G06F 3/0488; H04L 12/18; H04L 51/046; H04L 67/16; H04L 67/306
USPC ........................ 709/203, 204–207, 217–219
See application file for complete search history.

(56) References Cited

U.S. PATENT DOCUMENTS

| 2003/0078983 | A1* | 4/2003 | Sullivan et al. | 709/207 |
| 2009/0275348 | A1* | 11/2009 | Weinreich et al. | 455/456.3 |
| 2009/0298513 | A1* | 12/2009 | Hampel et al. | 455/456.1 |
| 2012/0166530 | A1* | 6/2012 | Tseng | 709/204 |

* cited by examiner

*Primary Examiner* — Ruolei Zong
(74) *Attorney, Agent, or Firm* — Brake Hughes Bellermann LLP (57) ABSTRACT

A method includes receiving, at a server, a dynamic current geographic location of a mobile computing device and, in response, accumulating individual push notifications that are relevant to the dynamic current geographic location of the mobile computing device. The individual push notifications are accumulated in a buffer over a first accumulation time interval. The method further includes sending a limited number of individual push notifications accumulated in the buffer at a controlled rate to the mobile computing device over a computer network.

25 Claims, 3 Drawing Sheets

FIG. 3

RATE LIMITER FOR PUSH NOTIFICATIONS IN A LOCATION-AWARE SERVICE

TECHNICAL FIELD

This disclosure generally relates to location-aware notifications for mobile computing devices.

BACKGROUND

Mobile and connected devices (e.g., smart phones, tablets, etc.), which provide Internet connectivity to device users on the move, are transforming patterns of social and business behavior. Consumers are increasingly integrating mobile behaviors into their lifestyles. There is a growing use of mobile applications, not merely mobile search browsers, for diverse purposes including receiving information and communications automatically.

A mobile application or service for mobile computing devices may, for example, automatically send or push "informative" notifications from multiple data sources (e.g., e-mail arrival notices, text messaging, advertisements, stock market data, etc.) to a mobile computing device user. In general, the push notifications (e.g., e-mail arrival notices) may be insensitive to an instantaneous or current location of the mobile computing device. However, a location-aware service may select and push notifications based on the current location of the mobile computing device. The location-aware service may, for example, push location-based notifications that inform the mobile computing device user of places of interest (e.g., restaurants, tourist attractions, hotels, bus routes, etc.) that are in the vicinity of the mobile computing device's current location. The location-based notifications may, for example, be displayed in an application (e.g., a map application) running on the mobile computing device or in a designated notification area (e.g., a system tray or taskbar) outside of any applications running on the mobile computing device.

When the mobile computing device user is traversing an area with a high density of places of interest (or rapidly passing by places of interest in the area), a large number of "informative" push notifications may appear together at about the same time on the mobile computing device. The large number of push notifications, which may take considerable time and effort to peruse, may overwhelm the user. The purpose of the notifications to inform the user will be defeated if the user is unable to meaningfully peruse the large number notifications.

Consideration is now being given to location-aware services for meaningfully informing mobile computing device users without overwhelming them.

SUMMARY

According to one general aspect, a computer-implemented method regulates a rate at which location-based push notifications are sent by a location-aware service to a mobile computing device user. A location-based push notification may, for example, provide information about a relevant nearby place (e.g., a restaurant) that is close to a current location of the user. The location-based push notification may be displayed, for example, on a map on the mobile computing device. A location-based push notification may be generated each time a relevant nearby place is in range of the mobile computing device user's current location. A large number of location-based push notifications can be generated if the mobile user is traversing a geographic area quickly, or if there are many relevant nearby places in the geographic area. The rate at which the location-based push notifications are sent out is regulated to avoid overwhelming the mobile computing device user with the large number of push notifications.

In a general aspect, a method includes receiving, at a server, a dynamic current geographic location of a mobile computing device, and in response accumulating in a buffer, over a first accumulation time period, individual push notifications relevant to the dynamic current location of the mobile computing device. The method further includes sending a limited number of individual push notifications accumulated in the buffer at a controlled rate to the mobile computing device over a computer network. The controlled rate, which may be dependent at least in part on a rate of change of the dynamic current geographic location of the mobile computing device, may amount to sending the individual push notifications at a rate of no more than about one individual push notification per minute.

In another aspect, the method involves assigning priority by relevancy to individual push notifications accumulated in the buffer. User- and/or system-established relevancy criteria may be used to prioritize the individual push notifications. The method further involves selecting the limited number of individual push notifications accumulated in the buffer to be sent according to their assigned priority.

In yet another aspect, the method involves, reprioritizing the individual push notifications accumulated in the buffer for relevancy in response to dynamic changes in the current geographic location of the mobile computing device.

In a further aspect, the method involves clearing and resetting the buffer after the first accumulation time period and re-accumulating individual push notifications relevant to the dynamic current geographic location of the mobile computing device for a second accumulation time interval and again sending a limited number of the accumulated individual push notifications in the buffer at a controlled rate.

In a general aspect, a tangible computer-readable storage medium has instructions stored thereon, which instructions when executed by one or more microprocessors cause a computer system to respond to receiving, at a server, a dynamic current geographic location of a mobile computing device. The computer system may respond by accumulating individual push notifications relevant to the dynamic current location of the mobile computing device in a buffer. The computer system may accumulate the individual push notifications in the buffer over a first accumulation time interval, and send a limited number of individual push notifications accumulated in the buffer at a controlled rate to the mobile computing device over a computer network.

In a general aspect, a computer system includes a memory configured to store executable code, and a processor operably coupled to the memory. The processor is configured to execute the code to respond to receipt of a dynamic current geographic location of a mobile computing device. The processor may respond by accumulating in a buffer, over a first accumulation time interval, individual push notifications relevant to the dynamic current location of the mobile computing device. The processor is further configured to execute code to send a limited number of individual push notifications accumulated in the buffer at a controlled rate to the mobile computing device over a computer network.

In a general aspect, in response to a location-aware mobile computing device crossing into a geo-fenced region, a method involves receiving, at a server, a location-based push notification for each of a multiplicity of relevant places in the geo-fenced region, and holding the multiplicity of the location-based push notifications in a buffer for a first predefined holding time period (e.g., a minute or more). The method further involves ranking the multiplicity of the location-based push notifications in the buffer at the server by relevance to a current location of the location-aware mobile computing device, and selecting a most relevant location-based push notification to send to the location-aware mobile computing device at its current location after the first predefined holding time period. In a further aspect the method involves sending only the selected most relevant location-based push notification to the location-aware mobile computing device at its current location.

The details of one or more implementations are set forth in the accompanying drawings and the description below. Other features will be apparent from the description and drawings, and from the claims.

DETAILED DESCRIPTION

Push technology is a style of Internet-based communication where a request for a given transmission of information is initiated by a publisher or a central server. Push technology may be contrasted with pull technology, where a request for transmission of information is initiated by a receiver or client. HTTP server push (also known as HTTP streaming) is a way to send data from a web server to a web browser. HTTP server push can be achieved by several techniques. In some cases, a web server does not terminate a connection after response data has been served to a client. The web server leaves the connection open so that if an event is received, it can immediately be sent to one or multiple clients. Otherwise, the data would have to be queued until the client's next request is received. Push notifications may use a constantly-open IP connection to provide notifications from servers (e.g., notifications related to third party web applications or browser extensions) to client computing devices (e.g., smart phones used by users who have installed the web applications or browser extensions). The notifications may, for example, include sounds, images, or custom text alerts.

A location-aware service may be an application that delivers location-based information to a subscriber of the service. The location-aware service may, for example, be accessed by mobile phone, PDA, pager, laptop, desktop of other device. The location-aware service may be a part of a larger location-based solution framework that includes, for example, GPS-enabled mobile computing services (e.g., communication and computation via mobile devices), location-enabling services (e.g., services for user-locating), and other location-aware services (e.g., IP-based applications).

Of interest here are location-aware services that send or push location-based notifications to a roaming user of a mobile computing device user. The location-based information in the notifications may be information that is relevant to the current geographic location of the mobile computing device. The relevant information may, for example, relate to nearby places of interest (e.g., a bus route, a neighborhood pizza parlor, a grocery store, etc.).

The current geographic location (hereinafter interchangeably "current location") of a mobile computing device may be determined using an on-board location sensor (e.g., a GPS receiver in communication with GPS satellites) or by other location-determining techniques (e.g., Cellular tower triangulation (Cell ID), or Wi-Fi (802.11) access point triangulation) that use other resources. For example, for a Cell ID-based location determination technique, a mobile computing device (e.g., a cellular phone) may have a capability to programmatically retrieve cell tower information. The cell tower information may include cell tower-identifying data (e.g., a cell tower code, an area code, and an international dialing code, etc.), which allows determination of the location of the cell tower using published maps of cell towers and, thus, determination, at least approximately, of the current location of the phone.

In general, the mobile computing device may be associated with a device-based or network-based "location-awareness" or "location-determining" software solution to process one or more of Wi-Fi, cell, GPS signals, ISP data and other data, to determine device location (e.g., a latitude/longitude reading of device location). The location-determining software solution may be integrated with device OS or other device or network applications. Location-based notifications that may be provided by the location-aware services of interest here may be responsive to the device location provided by the location-determining software solution associated with the mobile computing device.

Figure 1:
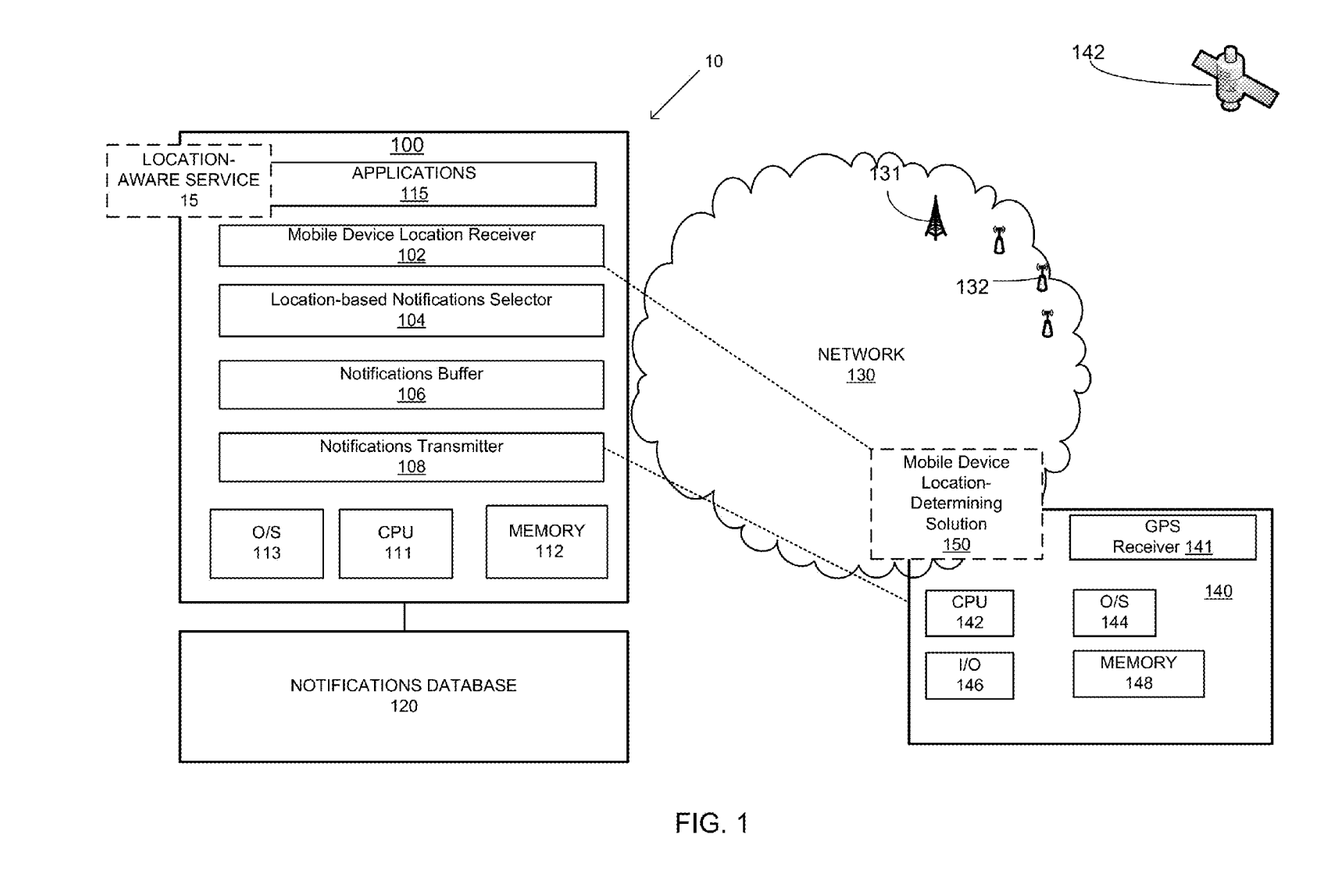
FIG. 1 is a block diagram illustration of an example system that may be used by a location-aware service to provide location-based notifications at a controlled rate to a mobile computing device user, in accordance with the principles of the disclosure herein.

FIG. 1 is a block diagram of an example system 10 that may be used by a location-aware service to provide location-based notifications at a controlled rate to a mobile computing device user, in accordance with the principles of the disclosure herein.

System 10 includes a "notifications" push server 100 coupled to a notifications database 120, which may be a store of location-based notifications that may have been previously prepared, for example, for different geographic areas covered by location-aware service 15. Notifications push server 100 may host a location-aware service 15, which may be made available to the user of mobile computing device 140. The user may subscribe to location-aware service 15 using, for example, a unique mobile device ID or other identifier, to receive location-based notifications. Notifications push server 100 may be communicatively linked to a mobile computing device 140 and configured to send push location-based notifications for location-aware service 15 to mobile computing device 140, for example, over a computer network 130. The location-based notifications, which are sent by notifications push server 100, may be selected from notifications stored in notifications database 120. Notifications push server 100 may be configured, for example, to dynamically send or push location-based notifications specifically to the user of mobile computing device 140 at a controlled rate. For this purpose, notifications push server 100 may include a mobile device location receiver 102, a location-based notifications selector 104, a notification buffer 106 and a notification transmitter 108.

In system 10, notifications transmitter 108 may be used by location-aware service 15 to send notifications to mobile computing device 140 over computer network 130. Mobile device location receiver 102 may be configured to retrieve or receive device location information and other information associated with mobile device 140. Mobile device location receiver 102 may, for example, be configured to retrieve device location information from a mobile device location-determining solution 150 that may be hosted on mobile computing device 140 or on computer network 130.

Mobile device location-determining solution 150 may be configured to process one or more of Wi-Fi, cell, and GPS signals and data from other sources (e.g., ISPs) to determine the current location of mobile computing device 140. FIG. 1 shows, for example, a GPS receiver 141 attached to mobile computing device 140. GPS receiver 141, which may be in communication with a GPS satellite system 142, may supply GPS signals that mobile device location-determining solution 150 can process to determine a current device location of mobile computing device 140. FIG. 1 also shows, for example, cellular tower 131 and Wi-Fi access points 132 in computer network 130, which can be used by mobile device location-awareness solution 150 to triangulate the current location of mobile computing device 140. Mobile device location-determining solution 150 may be communicatively linked to server 100 to provide mobile device location receiver 102 with its determination of the current location of mobile computing device 140.

Further, in server 100, location-based notifications selector 104 may be configured to select location-based notifications that are appropriate or relevant to the dynamic current location of mobile computing device 140 as retrieved or received by mobile device location retriever 102. Location-based notifications selector 104 may use pre-established criteria to select the appropriate or relevant notifications from notifications database. The criteria may, for example, involve selection based on distance and/or notification type. For example, in the case where the selected notifications relate to nearby places of interest, location-based notifications selector 104's selection of the notifications may be based on a distance criterion (e.g., nearby places of interest that are within a quarter mile of the current location) and a type criterion (e.g., fine dining restaurants). The criteria may be system or user established.

In system 10, location-aware service 15 may not immediately send the notifications selected by location-based notifications selector 104 to mobile computing device 140 to avoid, for example, inundating the user of mobile computing device 140 with an overwhelming number of notifications. Instead, location-aware service 15 may limit a number of selected notifications that are sent or control the rate at which the selected notifications are sent to mobile computing device 140. For this purpose, system 10 may be configured to accumulate the selected notifications as they are selected by location-based notifications selector 104 in notifications buffer 106. System 10 may accumulate the selected notifications over a first accumulation time interval, which may be preset (e.g., two minutes). It will be understood that accumulating the selected notifications may involve transferring actual copies of notifications (e.g., from notifications database 120) to notifications buffer 106 or simply involve maintaining a list of the selected notifications, which can be later retrieved from notifications database 120.

System 10 may rank the notifications accumulated in buffer 106 by relevancy to the current location of mobile device 140. As the current location of mobile device 140 changes or is updated during the first accumulation time interval, system 10 may dynamically re-rank the accumulated notifications for relevancy to the changed current location of mobile device 140. At the end of the first accumulation time interval, location-aware service 15 may send only a small number of the most relevant notifications accumulated in notifications buffer 106 to mobile computing device 140. The number of notifications that are sent may be sufficiently small (e.g., one to two) so that they can be meaningfully perused by the user of mobile computing device 140. System 10 may utilize notifications transmitter 108 to send the small number of the most relevant notifications to mobile computing device 140 over computer network 130.

System 10 may be further configured to clear and reset notifications buffer 106 after the small number of notifications have been sent at the end of the first accumulation time interval. System 10 may then begin another round of selecting location-based notifications that are relevant or appropriate to the then current location of mobile computing device 140 as retrieved or received by mobile device location receiver 102, and accumulating the selected notifications in notifications buffer 106 over a second accumulation time interval. System 10 may again select and send a small number of the most relevant accumulated notifications to mobile computing device 140 at the end of the second accumulation time interval in the same manner as the small number of the most relevant notifications sent at the end of the first accumulation time interval.

System 10 may repeat the process of accumulating selected location-based notifications over one or more accumulation time intervals and pushing a small number of the accumulated location-based notifications to mobile computing device 140. The process may be repeated as long as required by location-aware service 15 or the user of mobile computing device 140.

Mobile computing device 140, which is described in the foregoing as a subscriber of location-aware service 15, may take the form of any of a number of different device types, for example, a personal computer, laptop computer, tablet computer, netbook computer, or a web-enabled phone. Mobile computing device 140 may include a browser that may be used to access various types of content. Such content may include web sites, photos, video, audio and executable scripts, and applications (including, for example, location-aware service 15). Mobile computing device 140 may include a CPU 142, O/S 144, I/O 146, and memory 148. CPU 142 may be any general processor, and O/S 144 may be any one of many available operating systems. I/O 146 may be one or more devices used to communicate with computing devices, such as a keyboard, pointer, mouse, liquid crystal display (LCD) monitor, touch screen display, web camera, printer interface, modem, network card, etc. Memory 148 may be one or more storage devices configured to store data used by CPU 142 to perform certain functions.

Further, in the foregoing description of system 10, notifications push server 100 has been described only with respect to elements (e.g., 102-108) that relate to some functions of location-aware service 15. In practical implementations, notifications push server 100 may be a server which also has other functions. Notifications push server 100 may, for example, may be a central server including a central processing unit (CPU) 111, memory 112, operating system (O/S) 113, and applications 115. CPU 111 may be any general processor, and O/S 113 may be any one of many available operating systems. Memory 112 may be one or more storage devices configured to store information used by CPU 111 to perform certain functions. Applications 115 may include one or more web applications, browser extensions, or other applications (including, for example, location-aware service 15). CPU 111 may be any general processor or microprocessor which can execute code (e.g., executable code stored in memory 112) to cause system 10 (e.g., components 102-108) to perform as described above to provide location-based notifications at a controlled rate to a mobile computing device user.

In some implementations of system 10, a setup process may be used, for example, to allow a user of mobile computing device 140 to establish permissions, policies, and criteria for notifications from location-aware service 15. The setup process may allow the user to opt-in to receive particular types of notifications. The setup process may also allow the user to customize the relevancy criteria used by system 10 to select notifications to send to the user. For example, the user may be interested in finding prepared food in a neighborhood and may accordingly use the setup process to establish criteria for system 10 to select notifications with information about restaurants in the neighborhood.

Figure 2:
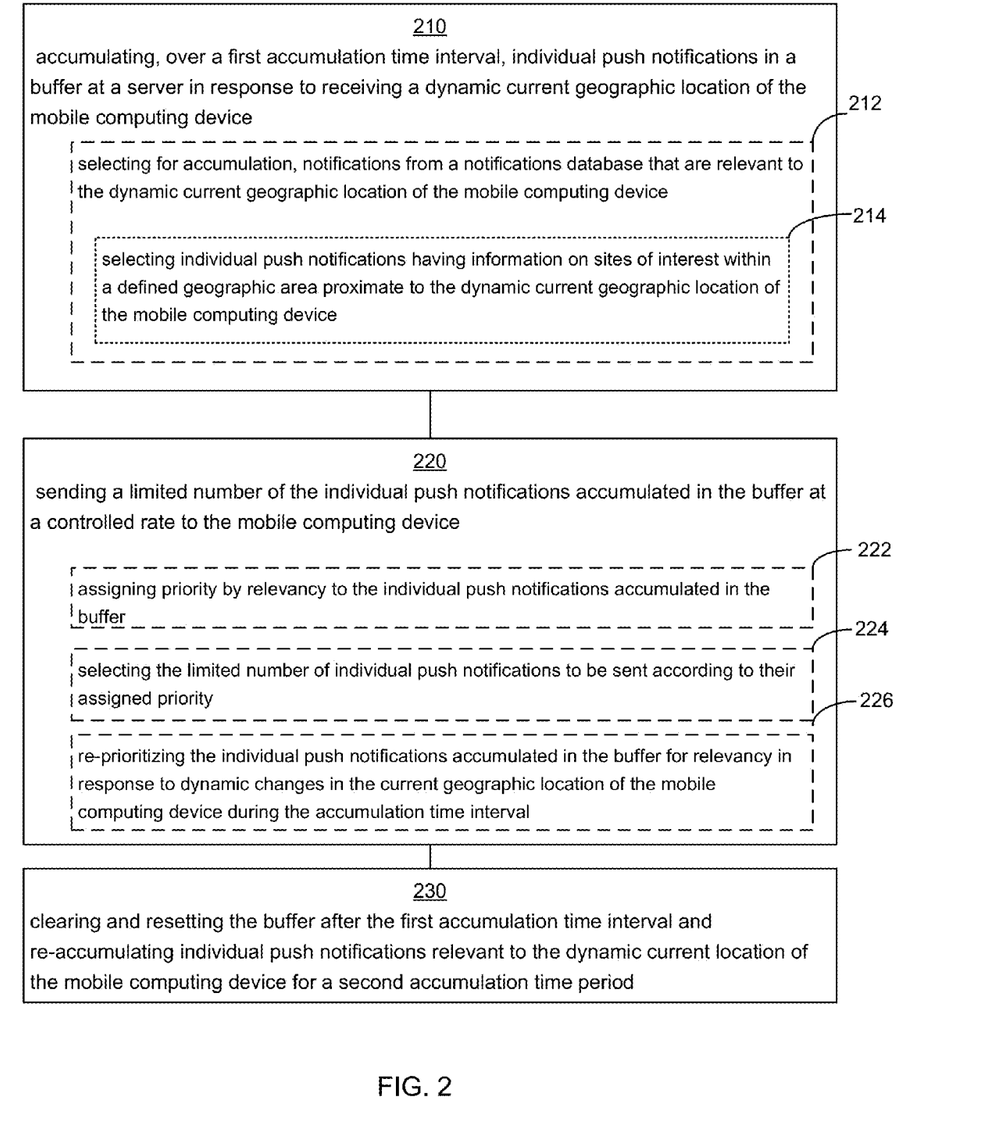
FIG. 2 is a flow chart illustrating an example method for providing location-based notifications to a mobile computing device user, in accordance with the principles of the disclosure herein.

FIG. 2 is a flow chart illustrating an example method 200 for providing location-based notifications to a mobile computing device user, in accordance with the principles of the disclosure herein. Method 200 may be utilized, for example, by a location-aware service (e.g., location-aware service 15) to provide location-based information to the mobile computing device user. Method 200 may be implemented over a computer network using a computer or server (e.g., notifications push server 100 described above) and utilize notifications for different geographic areas that may have been prepared and made available in one or more databases (e.g., notification database 120).

Method 200 includes accumulating individual push notifications in a buffer at a server in response to receiving a dynamic current geographic location of the mobile computing device (210), and sending a limited number of the individual push notifications accumulated in the buffer at a controlled rate to the mobile computing device (220). The controlled rate, which may be dependent at least in part on a rate of change of the dynamic current geographic location of the mobile computing device, may amount to sending the individual push notifications at a rate of no more than about one individual push notification per minute.

Accumulating individual push notifications in a buffer at the server 210 may include selecting for accumulation notifications from a notifications database that are relevant to the dynamic current geographic location of the mobile computing device (212). Selecting for accumulation notifications 212 may include selecting individual push notifications having information on sites of interest within a defined geographic area proximate to the dynamic current geographic location of the mobile computing device (214). The sites of interest may, for example, include one or more of tourist attractions, eating places, and lodgings within the defined geographic area proximate to the dynamic current location of the mobile computing device.

Further, in method 200, accumulating individual push notifications in a buffer at the server 210 may include accumulating the individual push notifications over a first accumulation time interval. A duration of the first accumulation time interval may be pre-set (e.g., two minutes). The first accumulation time interval may be automatically triggered by location-aware service 15, for example, when the mobile computing device enters a pre-defined geographic region, or upon user request for information related to the geographic area.

In method 200, sending a limited number of the individual push notifications accumulated in the buffer at a controlled rate to the mobile computing device 220, may include sending the limited number of the individual push notifications at the end or about the end of the first accumulation time interval. Sending a limited number of the individual push notifications accumulated in the buffer at a controlled rate to the mobile computing device 220 may include sending the individual push notifications at a rate of that is sufficiently low so that the user of the mobile computing device is not inundated or overwhelmed by the notifications and can meaningfully peruse the notifications. The controlled rate at which the push notifications are sent may depend on how fast or quickly the current geographic location of the mobile computing device is changing, which may be an indication of how fast or quickly the user is moving through a geographic area. Sending a limited number of the individual push notifications accumulated in the buffer at a controlled rate to the mobile computing device 220, may include sending the limited number of the individual push notifications at rate, which, for example, is inversely proportional to a rate of change of the dynamic current geographic location of the mobile device. Fewer notifications may be sent out if the mobile device user is moving quickly through the geographic area as the accumulated location-based notifications may become geographically less relevant with changes in the current location of the mobile device user, or because the user may not have time to peruse a large number of the notifications while moving. The push notifications may be sent, for example, at a rate of no more than about one to two push notifications every minute.

Further, in method 200, sending a limited number of the individual push notifications accumulated in the buffer at a controlled rate to the mobile computing device 220 may include assigning priority by relevancy to the individual push notifications accumulated in the buffer (222), and selecting the limited number of individual push notifications to be sent according to their assigned priority (224). Assigning priority to individual push notifications in the buffer 222 may involve using user- and/or system-established relevancy criteria to prioritize the individual push notifications. The user may, for example, have communicated interest in receiving informative notifications about restaurants serving a particular type of food (e.g., take-out food) or within a certain distance. Method 200 may accordingly assign priority to individual push notifications in the buffer, which provide information relating to fast food outlets and restaurants with take-out food menus, and which are within the certain distance from the current location of the mobile computing device. A notification about a restaurant at a center of a geographic area may become less relevant if the current location of the mobile computing device indicates that the user is moving out of the geographic area or moving away from the center. Accordingly, method 200 may also include re-prioritizing the individual push notifications accumulated in the buffer for relevancy in response to dynamic changes in the current geographic location of the mobile computing device during the accumulation time interval (226).

Method 200 may further include clearing and resetting the buffer after a first accumulation time interval and re-accumulating individual push notifications relevant to the dynamic current location of the mobile computing device for a second accumulation time interval (230), and again sending a limited number of the accumulated individual push notifications in the buffer at a controlled rate to the mobile computing device 220 as described above.

The location-aware service (e.g., location-aware service 15) may continue utilizing method 200 to iteratively accumulate individual push notifications relevant to the dynamic current location in the buffer and send a limited number of them at a controlled rate as described above. The location-aware service may stop the iterative process of sending a limited number of notifications to the user, for example, when the mobile computing device moves outside a pre-defined geographic area of interest, or when the user turns off or otherwise instructs the location-aware service to discontinue the notifications.

Location-aware or location-based services may use a concept of geo-fence. A geo-fence is a virtual perimeter for a real-world geographic area. The geo-fence may, for example, be dynamically generated (e.g., a radius around a store or point location), or a predefined set of boundaries (e.g., school attendance zones or neighborhood boundaries). The geo-fence may be custom digitized. A notification may be triggered when a location-aware device of a location-based service (LBS) user enters or exits a geo-fence. The triggered notification might contain information about the location of the device. The device (or service server) may receive the triggered notification, for example, over the computer network linking the device.

In response to a location-aware mobile computing device crossing into a geo-fenced region, a method involves receiving, at a server, a location-based push notification for each of a multiplicity of relevant places in the geo-fenced region and holding the multiplicity of the location-based push notifications in a buffer for a first predefined holding time period (e.g., a minute or more). The method further involves ranking the multiplicity of the location-based push notifications in the buffer at the server by relevance to a current location of the location-aware mobile computing device, and selecting a most relevant location-based push notification to send to the location-aware mobile computing device at its current location after the first predefined holding time period.

The method may involve re-ranking the multiplicity of the location-based push notifications in the buffer at the server by relevance to the then current location of the location-aware mobile computing device, in response to changes in the current location of the location-aware mobile computing device.

Further, the method may involve sending only the selected most relevant location-based push notification to the location-aware mobile computing device at its current location. The method may also involve clearing and resetting the buffer after sending the selected most relevant location-based push notification to the location-aware mobile computing device, and receiving, at the server, a next set of location-based push notifications relevant to the then current location of the location-aware mobile computing device.

Figure 3:
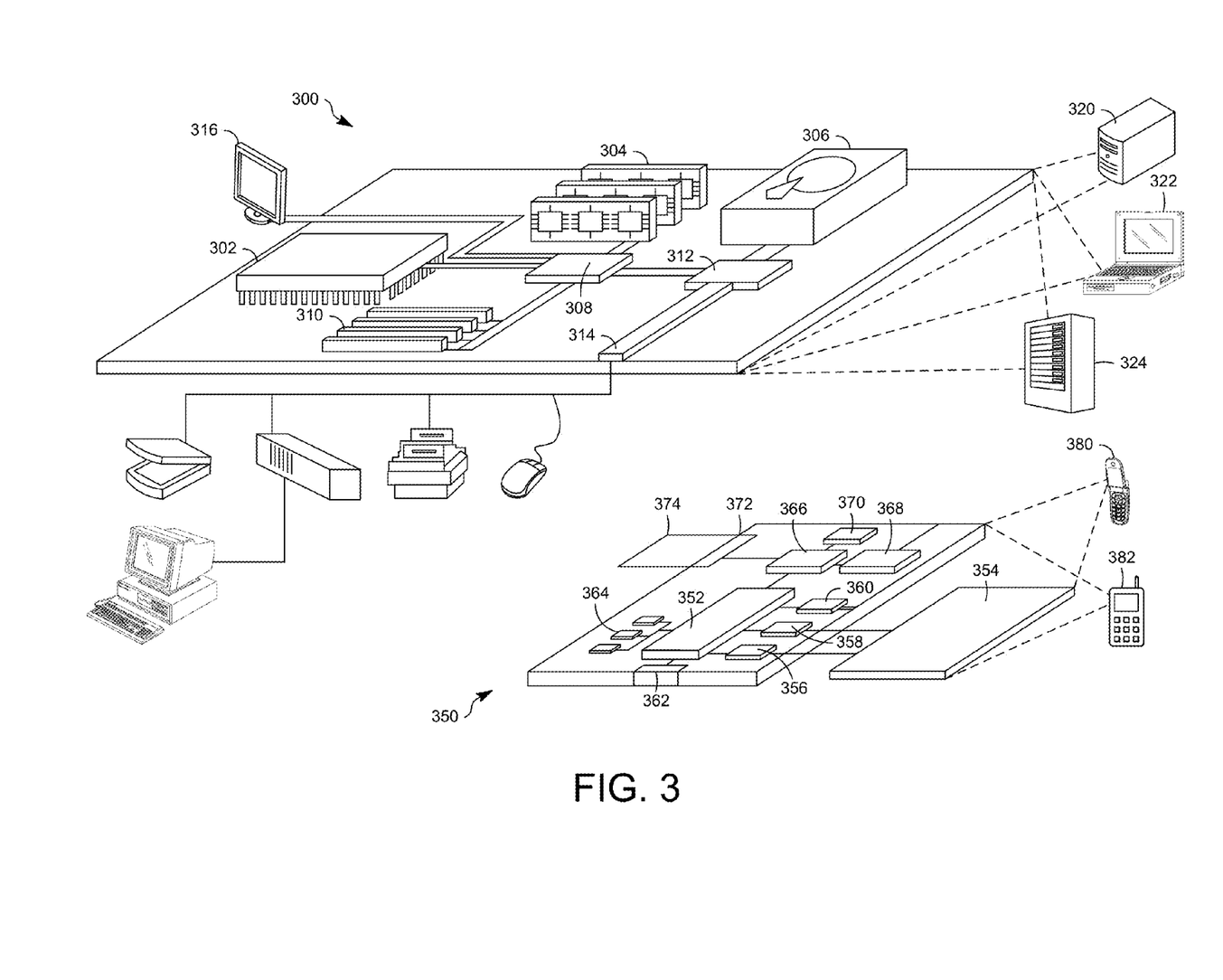
FIG. 3 is a schematic illustration of a generic computer device and a generic mobile computer device, which may be used with the techniques described herein Like reference symbols in the various drawings indicate like elements.

FIG. 3 shows an example of a generic computer device 300 and a generic mobile computer device 350, which may be used with the techniques described here. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, Wi-Fi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   in response to receiving, at a server, a dynamic current geographic location of a mobile computing device while the mobile computing device is moving through a geographic area,
   accumulating in a buffer, over a first accumulation time interval after receiving the dynamic current geographic location of the mobile computing device, individual push notifications relevant to the dynamic current location of the mobile computing device; and
   sending a limited number of individual push notifications accumulated in the buffer at a controlled rate to the mobile computing device over a computer network while the mobile computing device is moving through the geographic area,
   wherein the controlled rate at which the limited number of individual push notifications are sent while the mobile computing device is moving through the geographic area is dependent at least in part on a rate of change of the dynamic current geographic location of the mobile computing device.

2. The method of claim 1, wherein sending a limited number of individual push notifications accumulated in the buffer at a controlled rate to the mobile computing device includes sending the individual push notifications at a rate of no more than about one individual push notification per minute.

3. The method of claim 1, wherein the controlled rate is inversely proportional to the rate of change of the dynamic current geographic location of the mobile computing device.

4. The method of claim 1, further comprising, assigning priority by relevancy to individual push notifications accumulated in the buffer.

5. The method of claim 4, wherein assigning priority to individual push notifications in the buffer includes using user- and/or system-established relevancy criteria to prioritize the individual push notifications.

6. The method of claim 4, further comprising, selecting the limited number of individual push notifications accumulated in the buffer to be sent according to their assigned priority.

7. The method of claim 4, further comprising, reprioritizing the individual push notifications accumulated in the buffer for relevancy in response to dynamic changes in the current geographic location of the mobile computing device.

8. The method of claim 1, wherein accumulating in the buffer, over the first accumulation time interval, individual push notifications relevant to the dynamic current location of the mobile computing device includes accumulating individual push notifications having information on sites of interest within a defined geographic area proximate to the dynamic current location of the mobile computing device.

9. The method of claim 8, wherein the sites of interest include one or more of tourist attractions, eating places and lodgings within the defined geographic area proximate to the dynamic current location of the mobile computing device.

10. The method of claim 1, wherein receiving, at the server, a dynamic current geographic location of a mobile computing device location of the mobile computing device includes triggering the first accumulation time interval when the mobile computing device enters a pre-defined geographic region.

11. The method of claim 1, further comprising, clearing and resetting the buffer after the first accumulation time interval and re-accumulating individual push notifications relevant to the dynamic current geographic location of the mobile computing device for a second accumulation time interval and again sending a limited number of the accumulated individual push notifications in the buffer at a controlled rate to the mobile computing device.

12. A computer system, comprising:
   a memory configured to store executable code; and
   a processor operably coupled to the memory, the processor configured to execute the code to:
   in response to receiving a dynamic current geographic location of a mobile computing device while the mobile computing device is moving through a geographic area;
   accumulate in a buffer, over a first accumulation time interval after receiving the dynamic current geographic location of the mobile computing device, individual push notifications relevant to the dynamic current location of the mobile computing device; and
   send a limited number of individual push notifications accumulated in the buffer at a controlled rate to the mobile computing device over a computer network while the mobile computing device is moving through the geographic area,
   wherein the controlled rate is dependent at least in part on a rate of change of the dynamic current geographic location of the mobile computing device.

13. The computer system of claim 12, wherein the processor is configured to execute code to send the individual push notifications at a rate of no more than about one individual push notification per minute.

14. The computer system of claim 12, wherein the controlled rate is inversely proportional to the rate of change of the dynamic current geographic location of the mobile computing device.

15. The computer system of claim 12, wherein the processor is configured to execute code to assign priority by relevancy to individual push notifications accumulated in the buffer using user- and/or system-established relevancy criteria.

16. The computer system of claim 15, wherein the processor is configured to execute code to select the limited number of individual push notifications to be sent according to their assigned priority.

17. The computer system of claim 15, wherein the processor is configured to execute code to re-prioritize the individual push notifications accumulated in the buffer for relevancy in response to dynamic changes in the current geographic location of the mobile computing device.

18. The computer system of claim 12, wherein the processor is configured to execute code to accumulate in the buffer individual push notifications having information on sites of interest within a defined geographic area proximate to the dynamic current location of the mobile computing device.

19. The computer system of claim 12, wherein the processor is configured to execute code to trigger the first accumulation time interval when the mobile computing device enters a pre-defined geographic region.

20. The computer system of claim 12, wherein the processor is configured to execute code to clear and reset the buffer after the first accumulation time interval and re-accumulate individual push notifications relevant to the dynamic current geographic location of the mobile computing device for a second accumulation time interval and again send a limited number of the accumulated individual push notifications in the buffer at a controlled rate to the mobile computing device.

21. A method, comprising:

in response to a location-aware mobile computing device entering a geo-fenced region, receiving, at a server, a location-based push notification for each of a multiplicity of relevant places in the geo-fenced region;

holding the multiplicity of the location-based push notifications in a buffer at the server for a first predefined holding time period after the location-aware mobile computing device enters the geo-fenced region;

ranking the multiplicity of the location-based push notifications in the buffer at the server by relevance to a current location of the location-aware mobile computing device; and selecting a most relevant location-based push notification to send to the location-aware mobile computing device at its current location after the first predefined holding time period.

22. The method of claim 21, wherein the first predefined holding time period is at least about one minute.

23. The method of claim 21, further comprising, sending only the selected most relevant location-based push notification to the location-aware mobile computing device at its current location.

24. The method of claim 21, further comprising, in response to a changes in the current location of the location-aware mobile computing device, re-ranking the multiplicity of the location-based push notifications in the buffer at the server by relevance to the current location of the location-aware mobile computing device.

25. The method of claim 21, further comprising:

clearing and resetting the buffer after sending the selected most relevant location-based push notification to the location-aware mobile computing device; and receiving, at the server, a next set of location-based push notifications relevant to the then current location of the location-aware mobile computing device.

* * * * *